Aug. 23, 1949.  E. SHURTS  2,479,977
MILKER CONTROL
Filed Dec. 5, 1945  3 Sheets-Sheet 1
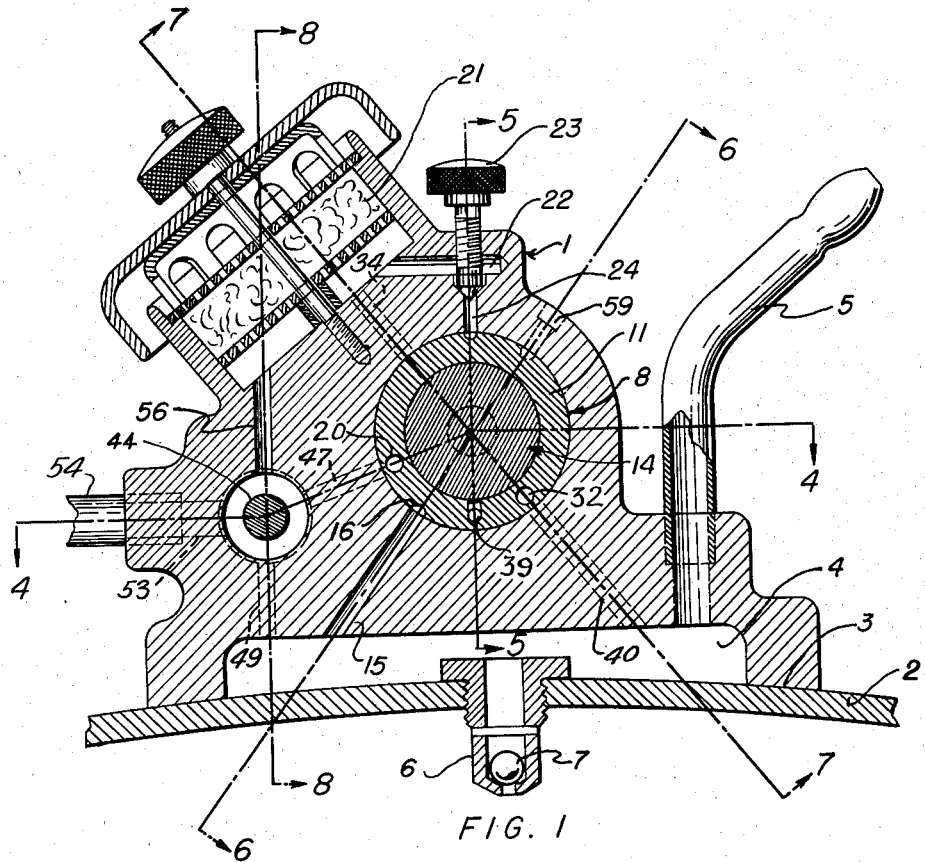
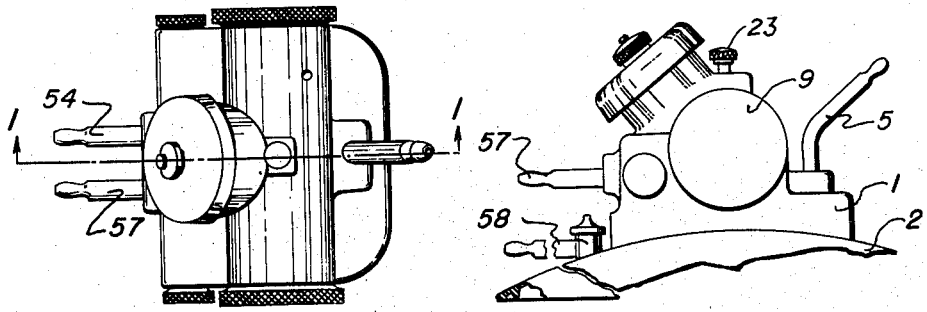

Aug. 23, 1949.                E. SHURTS                 2,479,977
                            MILKER CONTROL
Filed Dec. 5, 1945                                 3 Sheets-Sheet 2

Aug. 23, 1949.　　　　　E. SHURTS　　　　　2,479,977
MILKER CONTROL

Filed Dec. 5, 1945　　　　　　　　　　　　3 Sheets-Sheet 3

INVENTOR
Engelbert Shurts
BY
David A. Fry
attorney

Patented Aug. 23, 1949

2,479,977

UNITED STATES PATENT OFFICE 2,479,977

MILKER CONTROL

Englebert Shurts, Waukesha, Wis.

Application December 5, 1945, Serial No. 632,905

8 Claims. (Cl. 31—62)

This invention relates to motor valves for suction-type milking machines and resides more specifically in an improved form of the same in which a prompt, positive massaging action, consisting of application and release of pressure, more beneficial to the animal is produced, in which ready and simple regulation of the massaging rate to suit individual animals is provided, in which all entrance air is subjected to a filtering action, in which all working parts are readily and quickly disassembled and reassembled for complete and thorough cleaning without derangement or disturbance of adjustment, and in which all diaphragms or other parts susceptible of deterioration are dispensed with, the apparatus of this invention comprising a cylinder-mounted suction propelled oscillatable motor piston having a concentric cylindrical oscillation producing valve housed within the same and a separate shiftable massage action valve joined pneumatically with the motor piston cylinder so as to shift in keeping with reversal of propulsion forces in said motor cylinder rather than in keeping with its motion.

In milking machines of the suction actuated type the common practice is to provide a can or receiver into which the milk is drawn from the cow by suction applied through teat cups attached to the receiver by flexible tubing. The can is ordinarily provided with a cover upon which is mounted a pneumatically operated oscillatable motor of the piston or diaphragm type, mechanically connected to a valve which alternately applies pulses of suction and venting to separate flexible tubings connected to the outer shells of the teat cups to cause the flexible teat cup linings to execute a massaging action.

In all such appliances heretofore employed, intricate mechanical parts subject to wear have been necessary to communicate motion from the suction motor to the massaging valve. The experience has been that these parts become deranged with undesirable frequency and can only be repaired or replaced by one having special knowledge exceeding that of the ordinary user. Furthermore, in such appliances shifting of the massaging valve has been compelled to follow the motion of the motor with the result that a gradual transition from venting to suction is produced. It has been found, however, that the massaging pressure should be promptly applied and promptly relieved with rest intervals between the transitions in the massaging cycle in order to obtain optimum beneficial effect upon the animal. This form of massaging pulse has not heretofore been produced by suction driven devices.

Through the present invention the foregoing shortcomings of apparatus heretofore available are overcome. These and other objects and advantages of this invention will be made evident from the description of the invention which follows.

This invention is herein described by reference to the accompanying drawings forming a part hereof and in which there is set forth by way of illustration and not of limitation one form in which the apparatus of this invention may be embodied.

In the drawings:

Fig. 1 is an end view in elevation and in section of one form of the milking machine control valve of this invention;

Fig. 2 is a top plan view of the apparatus shown in Fig. 1;

Fig. 3 is a side view in elevation of the apparatus shown in Figs. 1 and 2, the same being shown in position on a milking machine can cover shown partly broken away;

Figure 4:
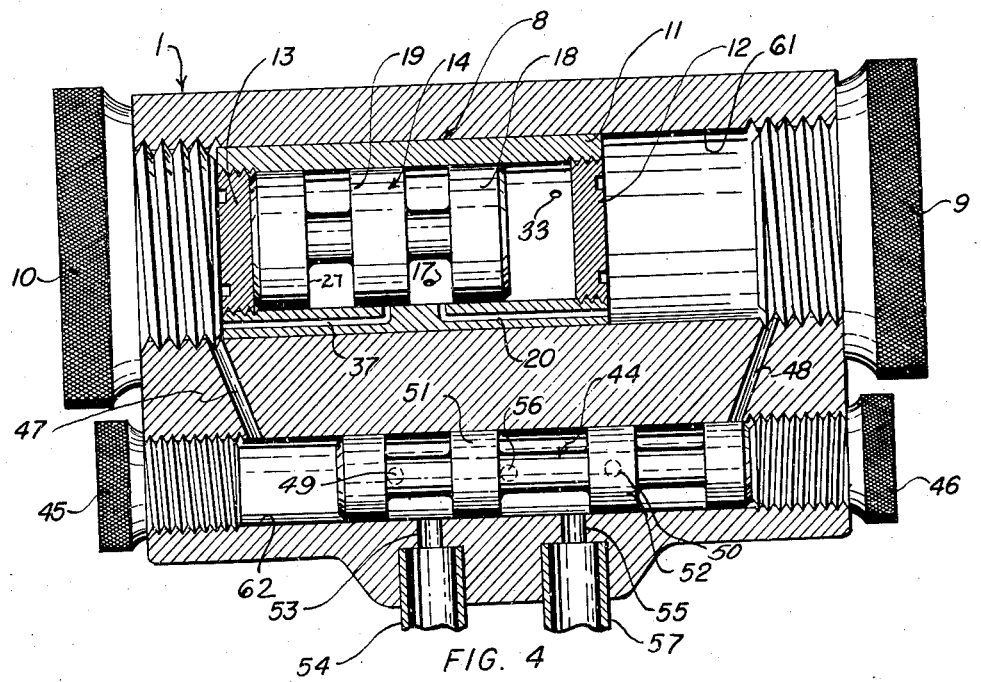
Fig. 4 is a view in section viewed through the bent plane 4—4 indicated in Fig. 1.

As appears in the drawings the milking machine control valve apparatus of this invention is made up of a valve and motor housing 1 secured to the upper crowned face of a milking machine can cover 2. The housing 1 is preferably cast from an appropriate alloy such as brass in keeping with the requirements of dairy equipment and is held in place by suitable means providing a hermetical joint with the cover 2. The bottom of the housing 1 is recessed as indicated at 4 to form a suction chamber from which air may be drawn through a suction nipple 5 intended to be attached to the so-called vacuum hose which furnishes the motive power for operation of the device.

Within the chamber 4 and extending downwardly through the cover 2 is a vacuum access and check valve fitting 6 containing a check valve ball 7. This valve permits suction to be maintained within a milking can to which the cover 2 is applied so as to draw milk from the animal and to hold said cover in place in well known fashion in case the suction hose is detached from the nipple 5.

Extending transversely through the housing 1 is a motor cylinder 61 within which a closely fitting but freely sliding piston member 8 is received. The motor cylinder is closed at its opposite ends by threaded plug members 9 and 10 which appear more clearly in Fig. 4. The piston member 8 is made up of a tubular sleeve-like portion 11 closed at its ends by threaded plugs 12 and 13 forming a closed valve chamber containing a closely fitting but freely sliding piston valve spool 14 so designated in Fig. 4.

Valve spool 14 is provided for the purpose of causing continuing oscillating motion in the motor piston 11 and for the purpose of accomplishing this, valve ports and passages to be hereinafter described are provided. In the several views of the drawings the motor piston 11 is shown in the extreme left-hand position ready to commence travel toward the right. The valve spool 14 has already been brought to the position necessary for this purpose.

Figure 5:
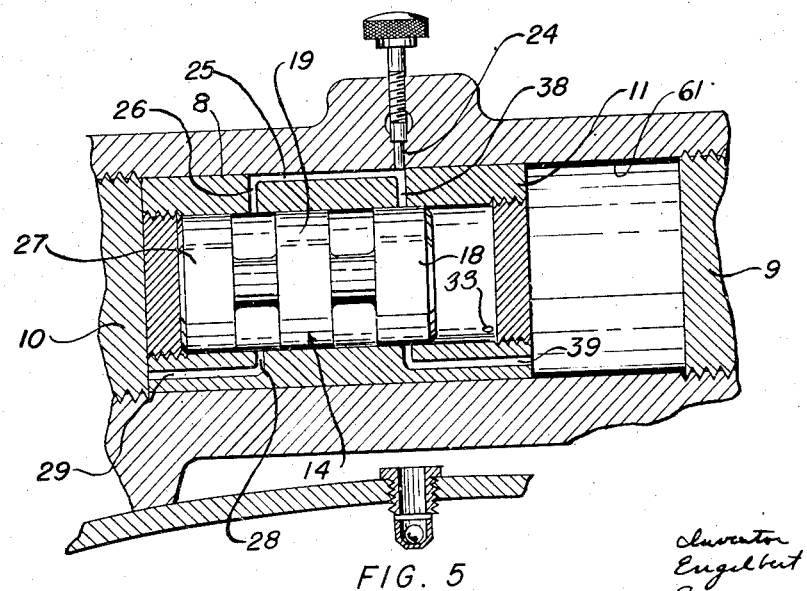
Fig. 5 is a view in section with parts broken away viewed through the plane 5—5 indicated in Fig. 1.
Figure 6:
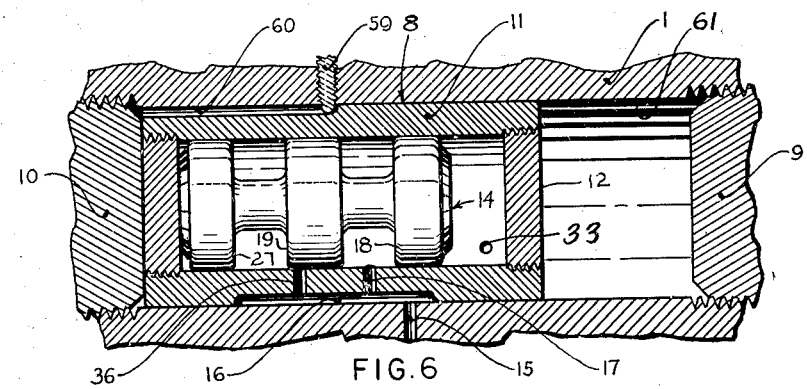
Fig. 6 is a view in section with parts broken away viewed through the plane 6—6 indicated in Fig. 1.

Motion of the motor piston 11 toward the right is caused to take place by reason of air being withdrawn through a channel 15 which communicates with a grooved port 16 in the surface of the piston 11 as shown more clearly in Fig. 6. Channel 16 in turn communicates through the port 17 with the space between piston faces 18 and 19 of the valve piston 14. The port 17 is thus brought into communication with a channel 20 which extends to the right within the wall of the motor piston 11 as shown in Fig. 4. In this way air is exhausted from the space between the end of the piston 11 and the plug 9, thus tending to urge the piston 11 to move toward the right. At the same time filtered air drawn through a filter 21, and the passage 22 passes beneath the tip of a throttling needle valve 23 and enters a channel 24 as shown in Fig. 1. As appears more clearly in Fig. 5 the channel 24 is in communication with a grooved port 25 formed on the surface of the motor piston 11. The port 25 in turn communicates through the port 26 with the space between piston faces 19 and 27 of the piston valve 14. In this way communication is established through port 28 and longitudinal bore 29 with the space between the left hand end of the piston 11 and the plug 10. Atmospheric air thus entering this space acts to cause the piston 11 to move to the right as air is exhausted from its opposite side.

The rate at which the piston 11 travels in the motion described is subject to regulation by adjustment of needle valve 23 since the piston 11 can travel no faster than the admission of venting air permits.

Figure 7:
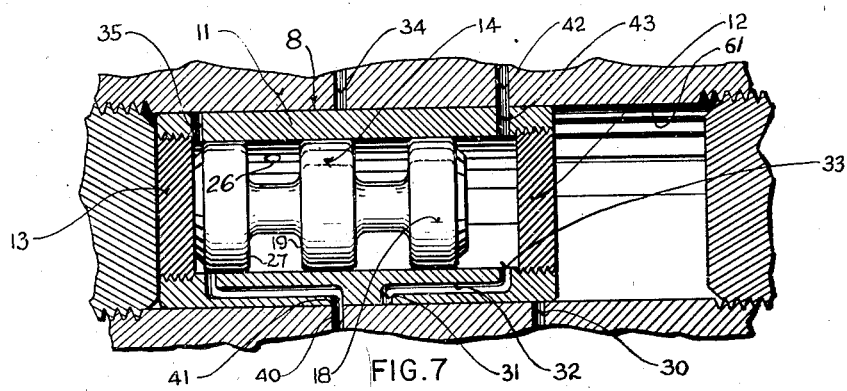
Fig. 7 is a view in section viewed through the plane 7—7 indicated in Fig. 1, parts being shown broken away.

As soon as the piston 11 arrives at the right hand end of its travel and at the moment the same comes into contact with the plug 9, suction port 30 as shown in Fig. 7 comes into communication with port 31 in the piston 11 and thus through the longitudinal channel 32 and the entrance port 33 is brought into communication with the space between the valve piston face 18 and the plug 12. This tends to urge the valve spool 14 to shift promptly to the right and this motion is rendered positive by the immediate admission of venting air from filter 21 through the vent port 34 which comes simultaneously into registry with the port 35. The immediate and prompt shifting of the valve spool 14 then sets up the necessary conditions for propulsion of the motor piston 11 toward the left, the same being accomplished through suction derived through the port 36 being applied through the port 37, see Figs. 4 and 6, and by venting being applied through port 38 and longitudinal passage 39, see Fig. 5. Upon arrival of the piston 11 in the left-hand position, valve spool 14 is promptly shifted to the left to cause the cycle to be repeated by reason of registry of suction port 40 with port 41 and the registry of vent port 42 which leads from filter 21 with port 43 as shown in Fig. 7. Sometimes hereinafter the position of the piston member 8 in which it is shown in Figs. 4, 5, 6 and 7 is termed the left-hand position while its position at the opposite end of the motor cylinder 61 is termed the right-hand position. Also, the position of the piston valve 14 with respect to the piston member 8 in which it is shown in Figs. 4, 5, 6 and 7 is referred to as the left-hand or first position and the opposite relative position of piston valve 14 is referred to as the right-hand or second position. The vent ports 42 and 43 and suction ports 30 and 31, as shown in Fig. 7, being disposed toward the right of the apparatus are referred to at times as right-hand vent and suction ports, while the vent ports 34 and 35 and the suction ports 40 and 41, as shown in Fig. 7, being disposed toward the left are referred to at times as left-hand vent and suction ports. However, vent ports 42 and 43 are at times grouped with suction ports 40 and 41 and referred to as first position vent and suction ports since they simultaneously come into registry and cause the valve 14 to move to its first position. Similarly, vent ports 34 and 35 and suction ports 30 and 31 are at times grouped together and referred to as second position vent and suction ports since they simultaneously come into registry and cause the valve 14 to move to its second position.

The foregoing description relates to the part of the apparatus of this invention which is intended to establish the cycle intervals, which timed intervals may be regulated by the adjusting valve 23 within limits desired. In the well known form of milking machine continuous suction is applied to the interior of the teat cups by means of a milk tube for the purpose of withdrawing the milk and conveying it to the container. Provision is made for attachment of the necessary milk tube to the apparatus at the milk tube connection 58. At the same time the intermediate wall of the teat cup is alternately expanded and contracted so as to produce a massaging action necessary for the withdrawal of the milk from the cow without injury. This alternate contraction and relaxation of the intermediate wall of the teat cup is accomplished by first permitting the suction applied through the milk tube to cause the intermediate wall to collapse and contract under the influence of atmospheric pressure freely admitted in the space surrounding the exterior of the intermediate wall. Relaxation or expansion of the intermediate wall is accomplished by exhausting air from the shell or space immediately surrounding the intermediate wall until pressure is approximately equal to the lower pressure prevailing in the milk tube. This action demands that means be provided for alternately venting and withdrawing air from the outer shell of the teat cups.

To produce the alternate suction and venting required for the massaging action there is included within the main housing 1 a valve casing 62 containing a freely sliding but closely fitting valve spool 44 movable between the position shown in Fig. 4 and a position in which the spool 44 is in contact with the plug 45. A similar plug 46 closes the opposite end of the valve casing 62. Movement of the valve spool 44 to and from the positions described is accomplished by alternate suction and venting applied through ports 47 and 48 which join with the opposite ends of the motor cylinder 61 in which the motor piston 11 is located. The spool 44 thus moves in accordance with the dictation of the condition of venting or suction prevailing in the ends of the motor cylinder 61 rather than in company with the motion of the motor piston. Furthermore, this motion of valve 44 takes place very rapidly almost immediately following any change from venting to suction in the motor cylinder 61.

Figure 8:
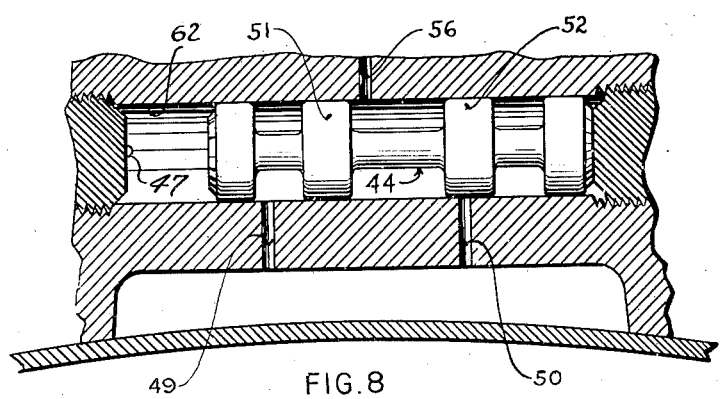
Fig. 8 is a view in section viewed through the plane 8—8 indicated in Fig. 1, parts being shown broken away.

Entering the valve casing 62 in which the valve 44 is located are a pair of suction ports 49 and 50, see Fig. 8, extending downwardly into the suction chamber 4 and arranged to be alternately covered and exposed by spools 51 and 52 of the valve 44. In the position of the valve 44 shown in Figs. 4 and 8 the suction port 50 is covered while the suction port 49 is exposed and thus brought into communication with port 53, see Fig. 4, joining with hose mounting 54 intended to be joined with the outer shell chambers of one set of teat cups. At the same time port 55 is in direct communication with vent port 56 which is in open communication with the air filter chamber of the air filter 21. Upon shifting of the valve spool 44 to the left port 55 is brought into communication with suction port 50 while the port 53 is placed in communication with vent 56.

From the foregoing it will appear that upon application of suction to the tube 5 motor piston 11 starts to oscillate and alternate pulses of suction and venting take place in the ports 53 and 55 and in the tubes 54 and 57 intended to be connected with the outer shells of sets of teat cups. These pulses, furthermore, consist of promptly applied suction terminated sharply with promptly released venting. There is an absence of gradual transition from suction to venting and from venting back to suction again. These prompt transitions appear to produce a massaging action more beneficial to the cow than the gradual transition cycles heretofore employed.

A locating pin 59 received in guide groove 60 in piston 11 insures retention of alignment of the various ports and guides the parts to proper assembly.

It is also apparent that by removal of the plugs 9, 10, 45 and 46 all moving parts of the apparatus can be immediately removed and much of the interior of the apparatus rendered accessible for cleaning. This is of importance since failure of rubber parts of the teat cups at times may cause milk to enter the apparatus in a manner not intended. If such occurs, the operator need not hesitate to remove the parts for cleaning since reassembly is very simple because no derangement of adjustment can be caused by such disassembly. Under ordinary circumstances such manipulation is not necessary since the filter 21 cleans all air entering the apparatus and thus ensures long trouble free operation.

I claim:

1. In a suction-driven milking-machine control, a motor cylinder having closed ends, a hollow motor piston mounted for oscillatory movement therein, a motor valve disposed within said hollow motor piston, vent and suction ports extending through said motor cylinder wall and through the wall of said piston and adapted to cooperate with said motor valve to cause the same to alternately vent and exhaust the spaces on the opposite sides of said piston to cause the same to continuously oscillate between the ends of said motor cylinder when suction is applied to said suction ports, vent and suction ports associated with said valve and adapted to cause the same to be shifted upon arrival of said piston at the opposite ends of its stroke, a pulsator valve casing, a separate pneumatically shiftable massaging pulsator valve mounted for movement in said pulsator valve casing, pneumatic connections between the ends of said motor cylinder and said pulsator valve casing adapted to shift said pulsator valve in response to application of suction and venting in the ends of said motor cylinder, and ports in said pulsator valve casing adapted for connection with suction and vent sources and with the outer shells of a set of teat cups.

2. In a suction-driven milking-machine control, a unitary housing containing a motor comprising a motor cylinder, a motor piston mounted for oscillatory movement therein, a motor valve adapted to be shifted in response to movement of said piston, vent and suction ports communicating through said valve with the ends of said motor cylinder and adapted to alternately vent and exhaust the spaces on the opposite sides of said piston to cause the same to continuously oscillate between the ends of said motor cylinder when suction is applied to said suction ports, a pulsator valve casing, a separate pneumatically shiftable massaging pulsator valve mounted for movement in said pulsator valve casing, pneumatic connections between the ends of said motor cylinder and said pulsator valve casing adapted to shift said pulsator valve in response to shifting of suction and venting in the ends of said motor cylinder, ports in said pulsator valve casing adapted for connection with suction and vent sources and with the outer shells of a set of teat cups, and an integral filter mounted on said housing and interposed between the atmosphere and both said motor and said pulsator valve vent ports.

3. In a suction-driven milking-machine control, a motor comprising a motor cylinder, a motor piston mounted for oscillatory movement therein, a motor valve adapted to be shifted in response to movement of said piston, vent and suction ports communicating through said valve with the ends of said motor cylinder and adapted to alternately vent and exhaust the spaces on the opposite sides of said piston to cause the same to continuously oscillate between the ends of said motor cylinder when suction is applied to said suction ports, an adjustable throttling means in controlling relationship to said vent ports adapted to regulate the rate of admission of air therethrough to regulate the rate of oscillation of said motor piston, a pulsator valve casing, a separate pneumatically shiftable massaging pulsator valve mounted for movement in said pulsator valve casing, pneumatic connections between the ends of said motor cylinder and said pulsator valve casing adapted to shift said pulsator valve in response to application of suction and venting in the ends of said motor cylinder, and ports in said pulsator valve casing adapted for connection with suction and vent sources and with the outer shells of a set of test cups.

4. In a suction-driven milking-machine control, a motor cylinder, a motor piston mounted for oscillatory movement therein, motor valve means shiftable in response to the position of said piston and adapted to alternately vent and exhaust the spaces on the opposite sides of said piston to cause the same to continuously oscillate between the ends of said motor cylinder upon the application of suction and the admission of fluid to said valve means, a separate pneumatically shiftable massaging pulsator valve mounted for movement in a valve casing, pneumatic connections between the ends of said motor cylinder and said pulsator valve casing adapted to shift said pulsator valve in response to application of suction and admission of fluid in the ends of said motor cylinder, and ports in said pulsator valve casing adapted for connection with suction and vent sources and with the outer shells of a set of teat cups.

5. In a suction-driven milking-machine control, a housing, a motor cylinder in said housing, a motor piston mounted for oscillatory movement in said motor cylinder, motor valve means shiftable in response to the position of said piston and adapted to alternately vent and exhaust the spaces on the opposite sides of said piston to cause the same to continuously oscillate between the ends of said motor cylinder upon the application of suction and the admission of fluid to said valve means, a valve casing also formed in said housing, a separate pneumatically shiftable massaging pulsator valve mounted for movement in said valve casing, pneumatic connections between the corresponding ends of said motor cylinder and said pulsator valve casing adapted to shift said pulsator valve in response to application of suction and admission of fluid in the ends of said motor cylinder, and ports in said pulsator valve casing adapted for connection with suction and vent sources and with the outer shells of a set of teat cups and adapted to apply a cyclic series of suction and venting pulses to said teat cup shells.

6. In a suction-driven milking-machine control, a motor comprising a motor cylinder having closed ends, a hollow piston comprising a sleeve with capped ends oscillatable in said motor cylinder between right and left-hand positions, a piston valve slidable within said piston sleeve between right and left-hand positions therein, left-hand and right-hand vent ports in said motor cylinder registerable respectively with left-hand and right-hand vent ports in said piston sleeve when said piston is respectively in right-hand and left-hand positions, left-hand and right-hand suction ports in said motor cylinder registerable respectively with left-hand and right-hand suction ports in said piston sleeve when said piston is respectively in its left-hand and right-hand positions, said vent ports and suction ports being adapted to cooperatively act to move said valve to its right-hand position when said piston arrives at its right-hand position and to its left-hand position when said piston arrives at its left-hand position, a motor suction port extending through said motor cylinder wall and through said piston sleeve and adapted to be valve controlled by said motor valve to communicate with the right side of said piston when said piston and valve are in their left-hand positions and with the left side of said piston when said piston and valve are in their right-hand positions, a motor vent port extending through said motor cylinder wall and said piston sleeve and adapted to be valve controlled by said motor valve to communicate with the left side of said piston when said piston and valve are in their left-hand positions and with the right side of said piston when said piston and valve are in their right-hand positions whereby said piston is adapted to be continuously oscillated upon application of suction to said several suction ports and the admission of air to said several venting ports, and a milking pulsator valve pneumatically connected with the ends of said motor cylinder including a pulse controlling shiftable member adapted to be shifted by pressure conditions prevailing in the ends of said cylinder.

7. In a suction-driven milking-machine control, a motor comprising a motor cylinder a hollow piston comprising a sleeve oscillatable in said motor cylinder between right and left-hand positions, a piston valve slidable within the hollow in said piston sleeve between a first and a second position in opposite ends thereof, first position and second position vent ports in said motor cylinder registerable respectively with first position and second position vent ports in said piston sleeve when said piston is respectively in left-hand and right-hand positions, first position and second position suction ports in said motor cylinder registerable respectively with first position and second position suction ports in said piston sleeve when said piston is respectively in its left-hand and right-hand positions, said vent ports and suction ports being adapted to cooperatively act to move said valve to its second position in one end of said piston when said piston arrives at its right-hand position and to its first position in the opposite end of said piston when said piston arrives at its left-hand position, a motor suction port extending through said motor cylinder wall and through said piston sleeve and adapted to be valve controlled by said motor valve to communicate with the right side of said piston when said valve is in its first position and with the left side of said piston when said valve is in its second position, a motor vent port extending through said motor cylinder wall and said piston sleeve and adapted to be valve controlled by said motor valve to communicate with the left side of said piston when said valve is in its first position and with the right side of said piston when said valve is in its second position whereby said piston is adapted to be continuously oscillated upon application of suction to said several suction ports and the admission of air to said several venting ports, and a milking massaging pulsator valve connected with said motor to be shifted thereby.

8. In a suction-driven milking-machine control, a motor comprising a motor cylinder, a piston oscillatable in said motor cylinder between right and left-hand positions, a valve cylinder, a motor valve slidable within said valve cylinder between first and second positions, left-hand and right-hand vent ports in said motor cylinder registerable respectively with left-hand and right-hand vent ports in said valve cylinder when said piston is respectively in right-hand and left-hand positions, left-hand and right-hand suction ports in said motor cylinder registerable respectively with left-hand and right-hand suction ports in said valve cylinder when said piston is respectively in its left-hand and right-hand positions, said vent ports and suction ports being adapted to cooperatively act to move said valve to its first position when said piston arrives at its right-hand position and to its second position when said piston arrives at its left-hand position, a motor suction port extending through said motor cylinder wall and adapted to be valve controlled by said motor valve to communicate with the right side of said piston when said valve is in its first position and with the left side of said piston when said valve is in its second position, a motor vent port extending through said motor cylinder wall and adapted to be controlled by said motor valve to communicate with the left side of said piston when said valve is in its first position and with the right side of said piston when said valve is in its second position whereby said piston is adapted to be continuously oscillated upon application of suction to said several suction ports and the admission of air to said several venting ports, and a milking massaging pulsator valve connected with said motor to be shifted thereby.

ENGLEBERT SHURTS.

REFERENCES CITED

The following references are of record in the file of this patent:

UNITED STATES PATENTS

| Number | Name | Date |
|---|---|---|
| 924,997 | Klein | June 15, 1909 |
| 961,932 | Brown | June 21, 1910 |
| 1,113,942 | Anderson | Oct. 20, 1914 |
| 1,279,786 | Terry et al. | Sept. 24, 1918 |
| 1,552,538 | Brayshaw | Sept. 8, 1925 |
| 1,814,918 | Hansen | July 14, 1931 |